Figure 1:
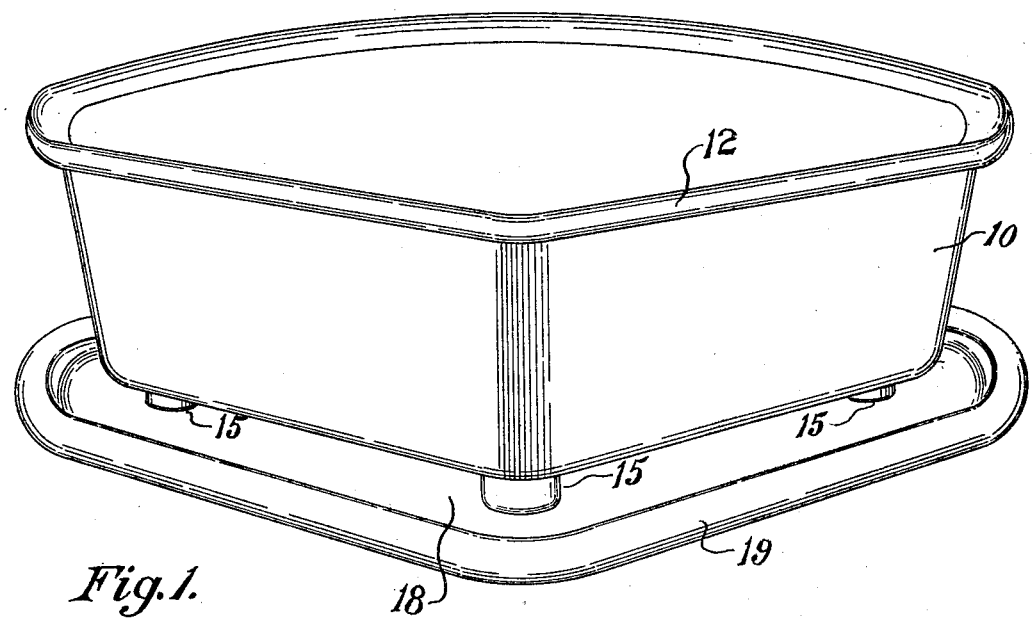

Dec. 27, 1932. C. M. CARLSON 1,892,481

SINK STRAINER

Filed Nov. 26, 1930

Inventor
C. M. Carlson
By Frease and Bishop
Attorneys

Patented Dec. 27, 1932

1,892,481

UNITED STATES PATENT OFFICE

CHARLES M. CARLSON, OF CANTON, OHIO, ASSIGNOR TO THE REPUBLIC STAMPING AND ENAMELING COMPANY, OF CANTON, OHIO, A CORPORATION OF OHIO

SINK STRAINER

Application filed November 26, 1930. Serial No. 498,392.

The invention relates to sink strainers adapted for the reception of fruit and vegetable parings, coffee grounds and other kitchen refuse.

Such receptacles are ordinarily formed of sheet metal and are usually provided, upon their under sides, with integral knobs or feet adapted for contact with the bottom of the sink. These knobs are ordinarily stamped in the bottom wall of the strainer, and are not of sufficient depth to space the strainer sufficiently above the sink bottom to permit proper drainage of the liquid portions of the contents through the perforate bottom of the strainer.

Furthermore, these knobs or feet being metal, they soon rust due to their continuous contact with moisture. This happens even where the sheet metal strainers are enameled, or otherwise coated, as this enamel coating soon cracks and breaks away from the feet due to frequent contact with the sink.

In emptying such strainers it is customary, in order to dislodge portions of the moist contents, to strike the edge of the inverted strainer upon the upper edge of the garbage can, marring the edge of the strainer and chipping or breaking the enamel coating thereon.

As these strainers are ordinarily left in the sink for some time before emptying, the contents thereof not only cause a disagreeable odor in the kitchen, but also draw flies.

In removing such strainers from the sink and carrying them to the garbage can difficulty is always experienced by the draining of moisture through the perforate bottom of the strainer, making it necessary to place a pan or the like beneath the strainer to prevent this moisture from dripping upon the floor.

The object of the present improvement is to provide an improved sink strainer which will overcome the above objections present in the ordinary form of sink strainer now in general use.

An important object of the invention is to provide knobs or feet of soft rubber or the like upon the bottom of the strainer to prevent marring or scratching of the enamel surface of the sink; to prevent the rusting of the feet or knobs of the strainer; and to space the strainer a sufficient height above the sink to permit the moisture to drain therefrom.

Another object is to provide a covering of rubber or the like around the rim edge of the strainer to prevent chipping of the enamel and marring of the rim edge of the strainer when the same is struck upon the edge of the garbage can to dislodge portions of the moist contents of the strainer.

A still further object is to provide a combined cover and tray or drip pan for the strainer which is adapted to be used as a cover when the strainer is standing in the sink and to be used as a tray to carry the strainer from the sink to the garbage can to prevent dripping of the contents of the strainer upon the floor.

Figure 2:
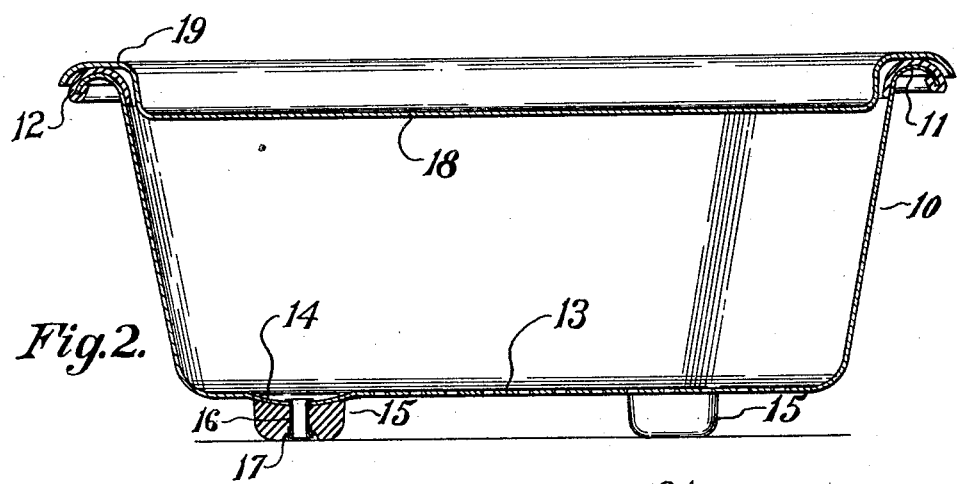
Figure 3:
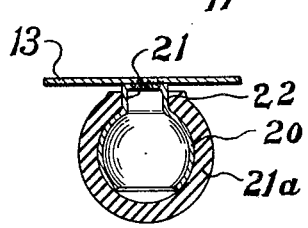
Figure 4:
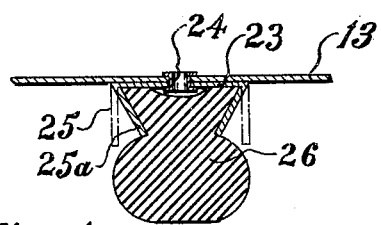

The above and other objects may be attained by constructing the improved strainer in the manner illustrated in the accompanying drawing, in which Figure 1 is a perspective view of the improved strainer showing the same positioned upon the tray or drip pan;

Fig. 2, a vertical sectional view through the strainer with the cover thereon; and Figs. 3 and 4, detail sectional views of modified forms of rubber feet for the strainer.

Similar numerals refer to similar parts throughout the drawing.

The improved strainer is indicated generally at 10 and may be formed of sheet metal, preferably enameled. The strainer may be of any desired size and shape, being preferably substantially triangular as illustrated in Fig. 1 in order that the same may conveniently fit within one corner portion of the sink.

The outwardly and downwardly curved rim edge 11 of the strainer serves as a finger hold, and is adapted to be covered by a rubber cushion member shown at 12 for the purpose of protecting this rim portion of the strainer and preventing marring of the same or chipping of the enamel thereon when the strainer in inverted position is struck upon the edge of a garbage can to dislodge portions of the contents which may adhere to the interior of the strainer.

The bottom wall 13 of the strainer is perforated in usual manner and may be provided with the slight depressions or feet 14 ordinarily formed in the sheet metal bottom.

It will be seen that if the strainer provided with such depressions were placed upon the bottom of a sink or the like, the bottom wall 13 would not be spaced above the bottom of the sink sufficiently to permit a proper drainage of moisture from the strainer through the perforate bottom thereof.

An important feature of the invention is the provision of feet or knobs of rubber which may be attached to the strainer at these points, these feet being indicated generally at 15 in Figs. 1 and 2.

From an inspection of the drawing it will be seen that these feet considerably space the perforate bottom wall 13 of the strainer above the surface upon which the same may be placed, thus permitting a proper drainage of moisture from the strainer.

It will also be seen that these rubber feet prevent contact of the bottom of the strainer with the sink or other surface upon which the strainer may be placed, thus preventing chipping of enamel upon the strainer as well as preventing marring of the surface of the sink, and entirely obviating the possibility of the feet becoming rusted or corroded.

As shown in Fig. 2, the rubber feet 15 may be attached to the bottom wall of the strainer by means of tubular rivets 16 of brass or other non-corrosive metal located through suitable apertures in the rubber foot and in the bottom wall of the strainer.

Preferably a flanged eyelet 17 may be placed in the lower end of the opening in the rubber foot and the eyelet 16 riveted or upset over the same as shown.

The strainer is adapted to be normally covered as by the combined cover and tray 18 having the offset angular rim 19 adapted to rest upon the rim edge of the strainer, as shown in Fig. 2.

When the strainer is removed from the sink and carried to the garbage can to be emptied, the combined cover and tray may be removed therefrom and the strainer placed upon the same, as shown in Fig. 1, thus preventing dripping of the contents of the strainer upon the floor, the offset rim 19 retaining upon the tray any moisture which may drain thereon from the strainer.

In Fig. 3 is shown a modified form of rubber foot which may include the spherical sheet metal knob 20 having a reduced neck portion 21 adapted to be connected to the bottom wall 13 of the strainer as by spot welding, riveting or the like.

A hollow rubber sphere 21a is adapted to be slipped over this sheet metal knob and provided with an opening 22 to receive the neck portion thereof.

Another form of foot is shown in Fig. 4 in which the sheet metal attaching member 23 is riveted or otherwise connected to the bottom wall of the strainer as indicated at 24. This attaching member is provided with a depending flange, the initial position of which is indicated in dotted lines at 25.

The rubber foot 26 is placed within this flange and the same is spun or bent inward to the position shown at 25a, retaining the foot upon the strainer.

I claim:

1. A sink strainer having a bottom wall, rubber feet upon the under side of said bottom wall, and tubular rivets located through said rubber feet and through the bottom wall for connecting the rubber feet to the bottom wall.

2. A sink strainer having a bottom wall, the bottom wall being provided with recesses, rubber feet upon the under side of the recesses, a flanged eyelet located in the lower portion of each rubber foot, and a tubular rivet extending through the bottom wall, rubber foot and eyelet, and having upset portions at its ends for securing the foot to the strainer.

3. A sink strainer having a bottom wall and side walls, said bottom wall being formed with perforations, rubber feet upon the under side of said bottom wall, and means for securing each said foot to said bottom wall, each said securing means being constructed to form an unobstructed opening through the adjacent rubber foot in registry with one of the perforations formed in said bottom wall.

4. In a sink strainer construction, the combination of a body member of substantially polygonal shape and having a perforated bottom wall and imperforate side walls terminating in an outwardly extending peripheral rim, rubber feet secured to said bottom wall at the corners thereof, a rubber covering for said rim, and a combined cover and tray member of substantially the same shape as said body member and provided with an upstanding marginal wall terminating in an outwardly extending flange adapted to fit over and interlock with said peripheral covered rim when used as a cover and when used as a tray the upstanding wall of said combined cover and tray member being arranged in a position to be engaged by the outer sides of said feet to prevent undue relative lateral movements between said body member and said tray member in substantially horizontal planes.

5. In a sink strainer construction, the combination of a body member of substantially polygonal shape and having a perforated bottom wall and imperforate side walls terminating in an outwardly extending peripheral rim, rubber feet secured to said bottom wall at the corners thereof, a rubber covering for said rim bent over and around the free edge of the latter, and a combined cover and tray member of substantially the same shape as said body member and provided with an upstanding marginal wall terminating in an outwardly extending flange adapted to fit over and interlock with said peripheral covered rim when used as a cover and when used as a tray the upstanding wall of said combined cover and tray member being arranged in a position to be engaged by the outer sides of said feet to prevent undue relative lateral movements between said body member and said tray member in substantially horizontal planes.

In testimony that I claim the above, I have hereunto subscribed my name.

CHARLES M. CARLSON.